(12) United States Patent
Bloem et al.

(10) Patent No.: US 6,560,215 B1
(45) Date of Patent: May 6, 2003

(54) METHOD AND APPARATUS FOR UPDATING A TIMING OFFSET IN A COMMUNICATION DEVICE

(75) Inventors: David Bloem, Crystal Lake, IL (US); Gary Howard, Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/379,673

(22) Filed: Aug. 24, 1999

(51) Int. Cl.[7] .............................. H04B 7/212; H04J 3/06
(52) U.S. Cl. ....................... 370/347; 370/350; 370/321; 370/503
(58) Field of Search ................................ 370/328, 335, 370/336, 345, 350, 347, 442, 321, 337, 503, 509, 517, 520, 518; 709/400; 455/502

(56) References Cited

U.S. PATENT DOCUMENTS

| 4,472,802 A | | 9/1984 | Pin et al. ..................... 370/104 |
| 4,642,806 A | | 2/1987 | Hewitt et al. .................. 370/95 |
| 4,797,678 A | * | 1/1989 | Tsuji et al. .................. 342/352 |
| 5,278,832 A | | 1/1994 | Binzel et al. ............... 370/95.3 |
| 5,355,515 A | | 10/1994 | Sicher ........................ 455/33.2 |
| 5,509,016 A | * | 4/1996 | Muller ........................ 370/350 |
| 5,640,672 A | | 6/1997 | Nawata ....................... 455/12.1 |
| 5,711,003 A | | 1/1998 | Dupuy ........................ 455/436 |
| 5,809,091 A | * | 9/1998 | Barrow ....................... 375/354 |
| 6,493,539 B1 | * | 12/2002 | Falco ........................ 455/67.1 |

FOREIGN PATENT DOCUMENTS

EP 0954115 3/1999

* cited by examiner

Primary Examiner—Dwayne Bost
Assistant Examiner—Yuwen Pan
(74) Attorney, Agent, or Firm—Brian M. Mancini

(57) ABSTRACT

A method for updating a timing offset for stored events scheduled in an event generator in a radio communication system including at least one base station and a mobile device includes a first step of measuring a change in a previously stored timing offset between a reference clock in the mobile device and a channel clock transmitted by the at least one base station. A second step includes adding the timing change to the previously stored timing offset in the timing offset register. A third step includes updating the timing offset in the event generator without interrupting execution of the stored events, such that synchronization is reacquired between the mobile unit and the base station. As a result, timing offset updating occurs without stopping or resetting the event generator.

14 Claims, 5 Drawing Sheets

METHOD AND APPARATUS FOR UPDATING A TIMING OFFSET IN A COMMUNICATION DEVICE

FIELD OF THE INVENTION

The present invention relates in general to communications, and more particularly to a communication system having a protocol timer.

BACKGROUND OF THE INVENTION

Time division multiple access (TDMA) communication systems share a common transmission medium between a number of simultaneous users. Each user's transmission does not interfere with that of the other users because their transmissions are separated from each other in time. A requirement of an effective TDMA communications device, such as a cellular telephone, is that the device retain accurate time synchronization with respect to the other users. Base stations in a GSM cellular phone system may not be synchronized with each other. When a mobile handset moves from one base station's coverage area to another, the handset must be re-synchronized with the new base station's time base. The transition must be handled in a timely manner to prevent a loss of information.

Some prior art techniques for retaining accurate time synchronization rely on a combination of software and hardware. These techniques suffer from timing errors and inhibit effective power management of the system. The timing errors result from errors introduced by software interaction with hardware, such as for example, interrupt latencies that delay software response to boundary conditions in the hardware when the call processor is called upon to direct all timing functions as well as call processing. Also, uncertainties may be introduced when hardware counters are modified by software. Correcting these errors requires increased software complexity. In addition, power consumption may be higher than desirable because the system's central processing unit (CPU) must remain in an active state to execute the software component of the timing. Moreover, there are some real-time constraints on the CPU which conflict with interrupt requests handled by the CPU. A large number of high-priority interrupts are undesirable and present complexity and reliability issues to the required software.

Other techniques have been suggested, such as in Ser. No. 09/061,958 filed Apr. 17, 1998 where the timing functions of the call processor are removed to separate hardware, a protocol timer, to relieve the call processor of some of its timing duties. The separate hardware contains an event generator containing preprogrammed timing instructions for each frame or superframe that can be triggered by the call processor, but then left alone to perform timing functions in the handset autonomously. This method, although an improvement in the art, still requires some call processor interaction to correct an offset timing when the handset loses synchronization with the base station or moves between cells. Typically, changing the offset timing requires shutting down the event generator, changing the offset, then restarting the event generator to be ready for the start of the next frame. However, the event generator can not be shut down if it is executing commands. Therefore the call processor must determine when the event generator will be idle.

The call processor can determine when the event generator is not executing commands by using either a polling loop or an interrupt service routine to check the event generator instructions to find an idle time. The polling loop technique ties up valuable call processor time with repeated reads of the event generator. In addition, there is a chance that the update time may be missed if the call processor is asked to perform a higher level task at that time. Interrupt servicing requires the call processor to insert an interrupt command into the event generator during a normally idle time. Then event generator must respond to this interrupt. Not only does this include call processor interaction with the event generator this introduces active management issues with the event generator and increased software operability.

Therefore, the need exists for an apparatus and method to control and update timing functions in a communication device while reducing the intensive timing interaction typically required from the main (call) processor. Additionally, it would prove beneficial to update timing during a frame without shutting down the event generator. It would also beneficial to implement such an improvement with relatively simple hardware and software.

DETAILED DESCRIPTION OF THE PREFERRED EMBODIMENT

Figure 1:
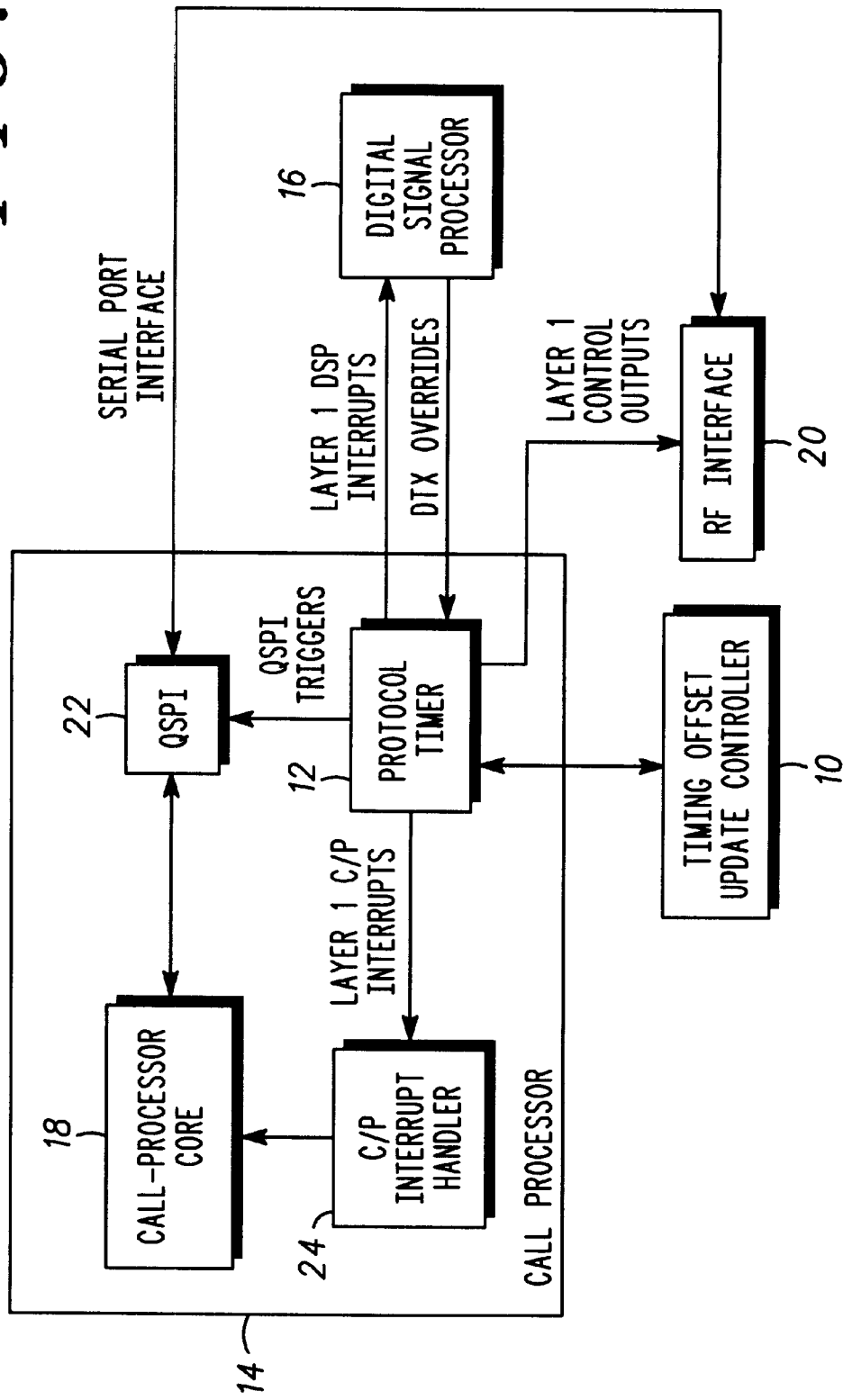
FIG. 1 illustrates, in block diagram form, a portion of a communication device having a protocol timer.

The present invention provides an apparatus and method to control and update timing functions in a communication device while minimizing call processor timing activities. The present invention provides the ability to update timing during a frame without shutting down the event generator. This is accomplished with simple hardware and a simplification of software.

Generally, the present invention provides a communications system that includes data processors and a separate protocol timer including an event generator. The protocol timer controls the timing of events in the communications system and operates substantially autonomously after the event generator is loaded with initial instructions. In this way, the other processors can be powered down when not in use. Also, by implementing the present invention with the protocol timer to update timing synchronization, the number of software related errors are reduced.

The term "bus" will be used to refer to a plurality of signals or conductors which may be used to transfer one or more various types of information, such as data, addresses, control, or status. Although the term "pin" is used throughout this document, this term is intended to encompass any type of apparatus which allows electrical signals to be transferred to or from an integrated circuit, such as, for example, integrated circuit bonding pads, solder bumps, wire conductors, etc.

In the following description, numerous specific details are set forth to provide a thorough understanding of the present invention. However, it will be obvious to those skilled in the art that the present invention may be practiced without such specific details. In other instances, circuitry has been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates, in block diagram form, a portion of a communications device having an RF interface 20, a digital signal processor (DSP) 16, a call processor 14 including a protocol timer 12, and an apparatus 10 for updating a timing offset, in accordance with the present invention. The call processor 14 (such as a microprocessor) also includes a core 18, a queued serial port interface (QSPI) 22, and a call-processor interrupt handler 24. The protocol timer 12 controls the RF interface 20, such as for waveform generation, interrupts for the DSP 16 and call-processor interrupt handler 24, and triggers the QSPI 22. The QSPI 22 handles all messaging between the call processor 14 and the RF interface 20. QSPI transfers are initiated upon receipt of a trigger signal from the protocol timer 12. Typical messages exchanged in a single frame are: automatic frequency control (AFC), transmit time slot—channel select and automatic output control, receive timeslot—channel select and automatic gain control, and receive channel power measurement. The call-processor interrupt handler 24 is used to mask, prioritize, and flag all incoming interrupts including those from the protocol timer 12. The DSP typically handles the speech coding functions including discontinuous transmit (DTX) decisions. In this context, the DSP 16 sends the protocol timer 12 override signals in order to shut down transmit waveforms to the RF interface 20.

In operation, the communication device receives a bit stream, comprising a plurality of serial bits, through its transceiver. The plurality of bits are organized into frames of bits and comply with a particular signaling protocol, such as for example, the Global System for Mobile (GSM) communications standard which has been implemented in Europe. QSPI 22 receives the bit stream through the RF interface 20 and converts the bit stream into a form that can be used by call processor 14 and DSP 16. Processor 14 receives the bit stream from the QSPI 22, and performs low level processing on the bit stream in accordance with the applicable protocol. Also, processor 14 multiplexes and demultiplexes the payload and control information from the bit stream and provides the control information to the DSP 16. Note that depending on the type of communications system, serial interface QSPI 22 may take various forms. Also, note that the communication system illustrated in FIG. 1 is for use in a time division multiple access (TDMA) system such as GSM. However, the present invention is not limited to GSM and may be applied to any TDMA system, either wireline or wireless.

In the illustrated embodiment, the apparatus 10 of the present invention, the protocol timer 12, and the processors 14 and 16 are implemented on the same integrated circuit. However, in other embodiments, more than one integrated circuit may be used. In addition, it should be recognized that a memory (not shown) could also be included, wherein the memory can be any type of volatile or nonvolatile random access memory. Moreover, input/output devices in the handset are not represented as these are known in the art.

It is preferred that the call processor timing interaction in the communication device be limited to once every multiframe (at best, a servicing rate of 8 Hz for GSM) or once per frame (at worst, a servicing rate of 217 Hz for GSM). Optimally, the call processor should only do one read/write trigger instruction at a convenient time in the frame structure. Thereafter, the protocol timer and timing offset update perform all timing functions, autonomously. The protocol timer enables receive and transmit waveform generation, inter circuit data transfers, and call processor to DSP messaging. The protocol timing also provides for: frame-clocked timeout counters useful for scheduling events which only occur on a multiframe basis, reference and channel hyperframe counters, event generators containing frame tables holding a predefined list of sequentially-executed events, macros which allow groups of repetitive events, such as those necessary for a receive burst, to be stored together in a single instruction event, and reference and channel clock frame counters for event scheduling with sub-symbol resolution. Typically, the channel clock is referenced from the reference clock by adding a supplied timing offset therebetween from a timing offset update controller 10, in accordance with the present invention.

Figure 2:
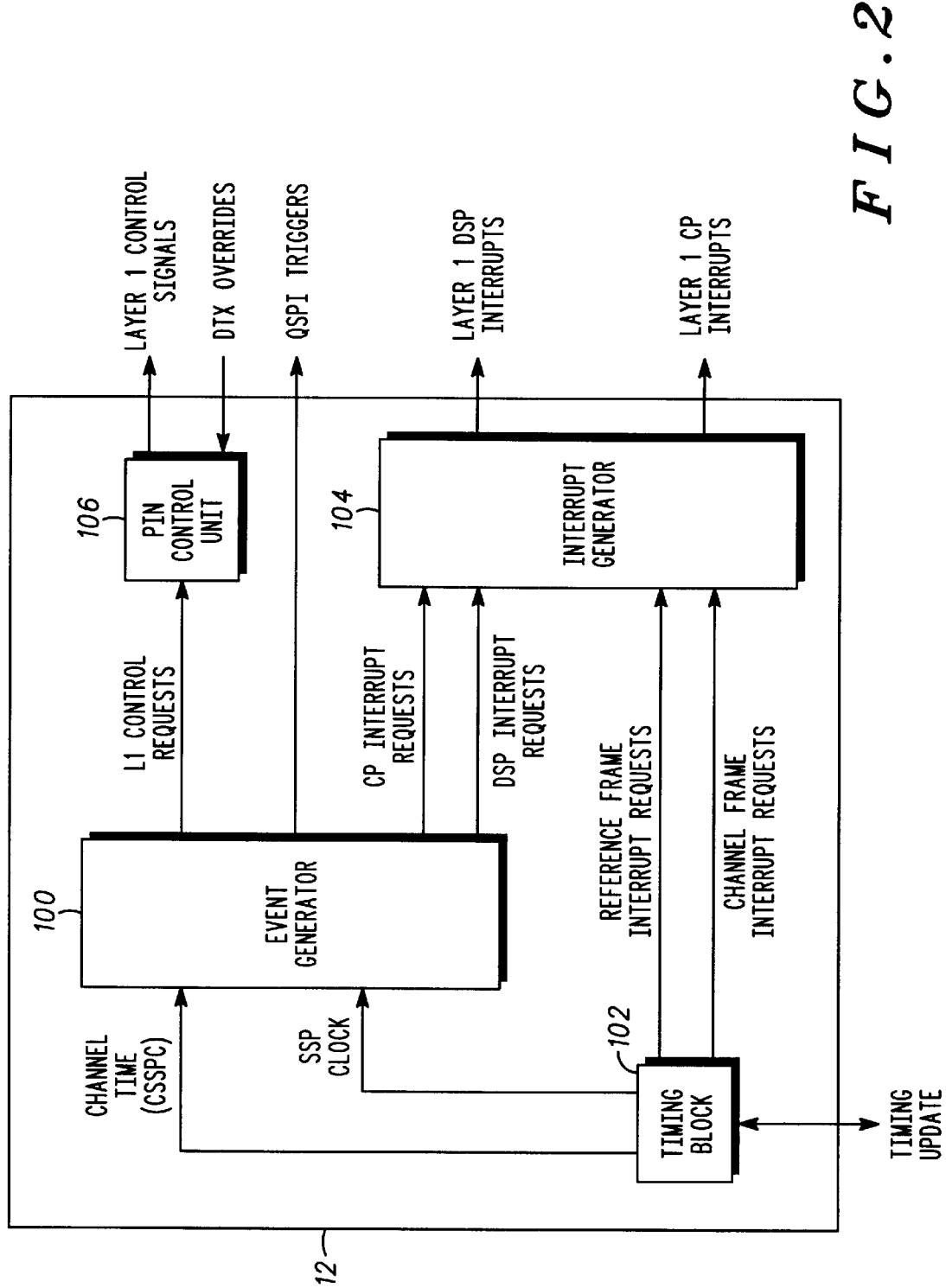
FIG. 2 illustrates, in block diagram form, the protocol timer of the communication device of FIG. 1 in more detail.

As shown in FIGS. 1 and 2, protocol timer 12 has a first plurality of output terminals for providing interrupts, labeled "DSP Interrupts", to an interrupt input of DSP 16, a second plurality of output terminals for providing interrupts, labeled "C/P Interrupts", to the interrupt handler 24 of the call processor 14, a third plurality of output terminals for providing control signals, labeled "Triggers", to QSPI 22, a fourth plurality of output terminals for providing control signals, labeled "Control Outputs", to the RF interface 20 which connects to the transceiver of the communication device, an DTX override input from the DSP 16, and a timing offset input from the timing offset update controller 10. It should be recognized that there are many more interconnections and components involved, but these are not shown for the sake of simplicity.

Generally, protocol timer 12 includes a plurality of stored event codes, and upon a match between a predetermined count value associated with an event, and a reference time value, protocol timer 12 causes a predetermined control function to occur. The event code can cause any of: (1) one of processors 14 or 16 to receive an interrupt signal; (2) generation of a control signal for use in the communication system, such as in the RF interface 20; (3) triggering of an event in a peripheral of the system; or (4) control of flow of event recognition in protocol timer 12. The target address of an event, such as for an interrupt, is selectable, based on the event code stored in protocol timer 12.

After instructions have been initially loaded into protocol timer 12 by the processor core 18, protocol timer 18 operates substantially autonomously. During operation, the events are alterable by the call processor. The interrupts cause the interrupted processor, either processor 14 or processor 16, to be interrupted from executing a current address to begin executing a selectable target address. Note that in the illustrated embodiment, processor core 18 initially loads the instructions. However, in other embodiments, processor 16, or another processor, not shown, may load the instructions.

The protocol timer 12 and the timing offset update controller 10, relieves processor 16 of all communications system timing control duties, including the generation of the interrupts and correction of timing. Protocol timer 12 generates timing information including the reference time value, and based on the timing information from the timing offset update controller 10. By operating autonomously after being programmed, protocol timer 12 provides several advantages over prior art communication systems. For example, processors 14 and 16 are relieved of providing timer information and can then be used exclusively for their main processing tasks. Also, because processors 14 and 16 are not required to execute the software component of system timing, the processors can maximize the time they operate in a low power mode, thus reducing power consumption. In addition, many of the software based timing errors in the prior art are eliminated because protocol timer 12 does many of the timing functions once controlled by software executed on a CPU and the timing offset update controller 10 provides all the necessary timing corrections.

FIG. 2 illustrates, in block diagram form, the protocol timer 12 of the communications device of FIG. 1. The protocol timer 18 includes an event generator 100 for holding frame and macro event tables, a timing block 102 including a programmable time base generator for maintaining channel and reference clock timing, a pin control unit 106 for bypass and tristating of event generator control requests, and an interrupt generator 104 to map interrupt requests from the timing block and event generator to the call-processor interrupt handler and DSP. It should be recognize that other circuitry is present, but not shown, for the sake of simplicity.

The present invention includes an apparatus for updating a timing offset for stored events scheduled in an event generator in a radio communication system including at least one base station and a mobile device. The apparatus includes: a timing detector for measuring a timing change in a timing difference between a reference clock in the mobile device and a channel clock transmitted by the at least one base station, a timing update controller coupled to a call processor of the mobile device, and a timing offset register coupled to the update timing controller, the timing detector and the event generator. When the timing detector indicates a timing change greater than one clock tick, the timing detector adds the timing change to the existing timing offset in the offset register to be read into the event generator without interrupting execution of the stored events, such that clock synchronization is restored between the mobile unit and the base station.

Preferably, an update mode selector is coupled to the timing update controller and the timing offset register. The update mode selector distinguishes between a small timing change between the mobile unit and a base station, such as when a distance changes therebetween within a cell, and a large timing change between the mobile unit and a base station, such as when the mobile unit moves between cells and base stations. Different amounts of timing change are handled differently. For example, when the update mode selector detects a large timing change, the call processor performs the search of the stored events in the event generator to find a suitable window in a timing frame to update the offset register. When the update mode selector detects a small timing change, the timing offset in the offset register is corrected by only one clock tick.

In practice, the present invention the radio communication system is a TDMA system and synchronization is reacquired during a frame. However, where the timing change is larger than one frame the timing change is added modulo M to the existing timing offset in the offset register, where M is a frame length in the TDMA system. This is necessary as the timing in the TDMA system is per frame and it is necessary to reference time per frame. Therefore, time changes greater than one frame are operated on modulo M so that proper timing within a frame is maintained.

In particular, the present invention include the timing block 102 converting the reference clock into various symbol and frame clock timing references. The timing block will: convert the reference clock into a sub-symbol period (SSP) clock, provide a reference frame clock which measures frame timing as an integer number of SSPs, provide a channel frame clock (of channel sub-symbol period counts, CSSPC) by adding an input timing offset to the reference frame clock, reset the reference frame clock when directed to by the timing update signal, and provide frame timeout clocks which generate interrupts upon timeouts.

The event generator 100 includes an event table comprising frame and macro tables, an event decoder, an addressing unit, and an event scheduler. The event table includes events to be executed and the frame timing at which each should occur using the applicable protocol, such as for example, GSM where the frame length is 5000 units. A list of example operation codes are included below in Table 1, and are for illustration purposes only.

TABLE 1

Frame Event Table

| Count Value | Event Operation Code | Comments |
|---|---|---|
| 5000 | MCU_Int0 | Prepare MCU for Burst RX |
| 4900 | DSP_Int0 | Prepare DSP for Burst RX |
| 4800 | RX_Macro(burst_rx_delay) | Do Burst Receive |
| 4600 | DSP_Int8 | DSP prepare TX Burst |
| 4300 | MCU_Int1 | Prepare MCU for Burst TX |
| 4200 | TX_Macro(burst_tx_delay) | Do Burst Transmit |
| 4000 | DSP_Int1 | RX Complete - Process Burst |
| 3400 | MCU_Int2 | Prepare MCU for Adjacent Cell RX |
| 3350 | DSP_Int4 | Prepare DSP for Adjacent Cell RX |
| 3200 | DSP_Int9 | TX Complete |
| 3000 | RX_Macro(adjacent_rx_delay) | Do Adjacent Cell Receive |
| 2600 | MCU_Int2 | Prepare MCU for Adjacent Cell RX |
| 2500 | DSP_Int5 | Adjacent Cell RX Complete - Process |
| 2499 | RX_Macro(adjacent_rx_delay) | Do Adjacent Cell Receive |
| 2100 | MCU_Int2 | Prepare MCU for Adjacent Cell RX |
| 2000 | DSP_Int5 | Adjacent Cell RX Complete - Process |
| 1999 | RX_Macro(adjacent_rx_delay) | Do Adjacent Cell Receive |
| 1500 | DSP_int6 | Last Adjacent Cell RX Complete - Process |
| 1001 | DSP_int15 | Enter Low power mode |
| 1000 | End_of_frame_repeat | Wait until counter rollover and repeat |

The event scheduler schedules the execution of the above events. At the appropriate times, the event decoder is signaled that it is time to execute an event. Based on the value of the event code, pin control unit 106 causes interrupt generation unit 104 to provide either DSP Interrupts to processor 16 or C/P Interrupts to processor 14, or pin control unit 106 may provide Control Outputs to RF interface 20, or cause the event generator to generate Triggers to QSPI 22. Protocol timer 12 may generate multiple interrupts to multiple CPUs. The event decoder executes the event, then signals the address generation unit to generate the address for the next event. The data for the next event is retrieved from memory then latched by the event decoder completing the execution cycle.

The programmable time based generator of the timing block includes a programmable down counter that counts from a predetermined value to zero. Upon reaching zero, the programmable down counter repeats counting from the predetermined value. For GSM applications the programmable counter is characterized as a modulo 5000 counter. Note that for use in other TDMA applications, such as for example, Asymmetrical Digital Subscriber Line (ADSL), the programmable time based modulo counter may be programmed for other count values. In response to the modulo 5000 counter reaching the count of zero, a rollover signal is provided to interrupt generation unit 104 and to pin control unit 106. In response to receiving the rollover signal, pin control unit 106 resets frame table address generator, and interrupt generation unit 104 may be programmed to provide an interrupt to processor 14 or processor 16. In addition, the event table can be timed from relative time values instead of absolute values. In this way, the absolute clock can be corrected without having to reprogram the timing of each event.

Because many of the events necessary for processing data are similar to each other, those events can be collected and stored as one macro event. For example, events for receive bursts of data and for adjacent cell power measurements are similar and can each be represented with one macro event pointing to instructions in the macro table. By collecting events into macros, event tables can be smaller, thus requiring less memory space in the data processing system. Also, organizing a number of events as macros allows events and macros to be executed in parallel. The ability to execute events and macros in parallel may be important, for example, when it is necessary to begin preparing for a transmit operation before a receive operation has ended.

When a mobile cellular telephone changes its distance within a cell or is transitioning from one GSM base station, operating from one time base, to another GSM base station operating from another time base, re-synchronization of the reference clock of the handset to the channel clock is required. The re-synchronization is triggered by the protocol timer 12 using the event tables as described above and controlled by the timing offset update controller 10. Because software execution on an MPU is not used for triggering time-critical tasks, such as base station handoff, time-critical tasks scheduling may be handled more efficiently.

Figure 3:
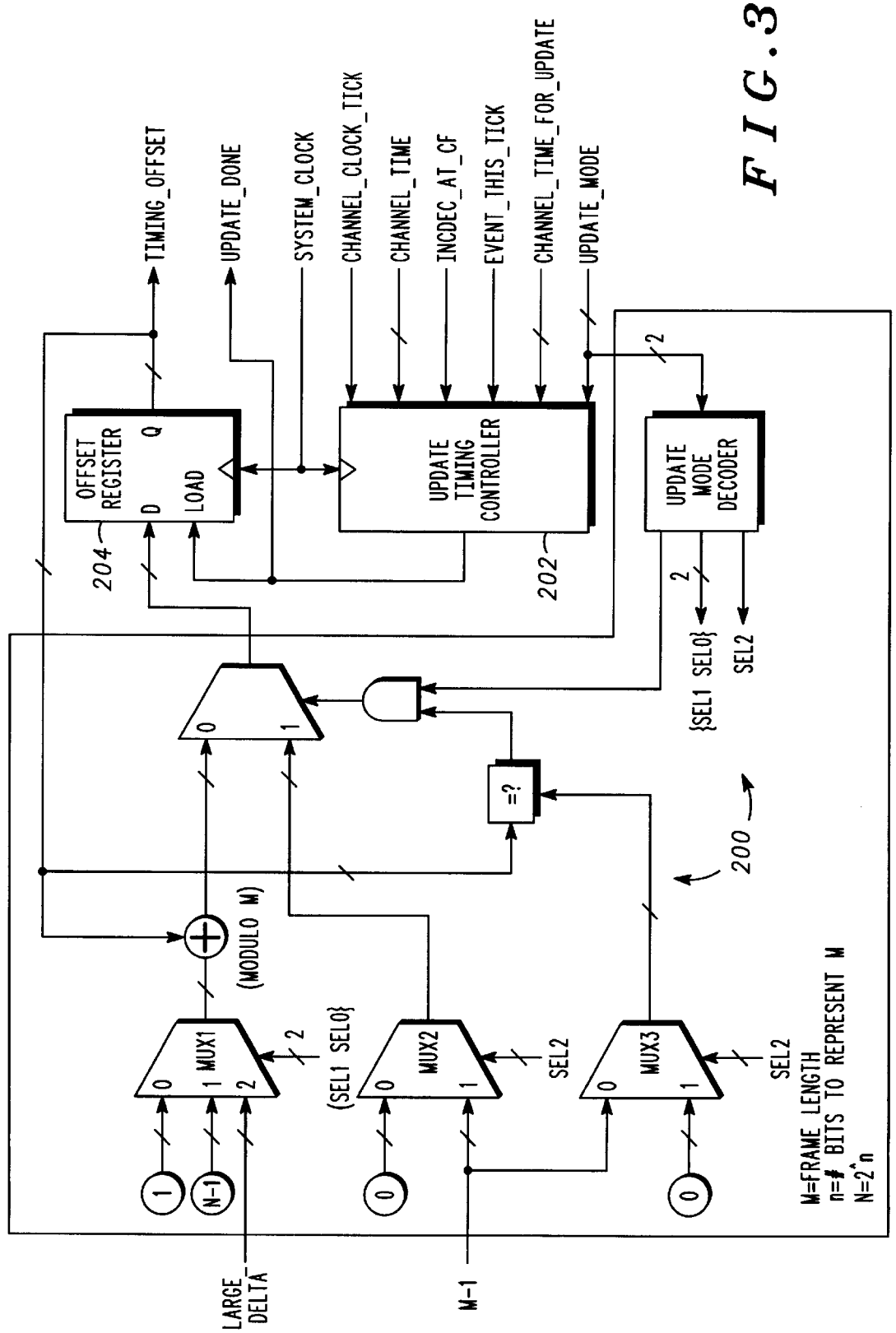
FIG. 3 illustrates, in block diagram form, the timing offset update controller of the communication device of FIG. 1 in more detail, in accordance with the present invention.

FIG. 3 illustrates the timing offset update controller 10 of FIG. 1, in accordance with a preferred embodiment of the present invention. The timing offset update controller 10 is used to adjust the offset value between the reference clock and the channel clock in the protocol timer 12. The timing offset update controller 10 comprises three components: an offset selector 200, an update timing controller 202, and a timing offset storage register 204, among other connection circuitry and bus control circuitry (not shown).

The update selector 200 receives information defining the mode of the offset. The timing offset update controller 10 operates in one of four modes: no offset, a large offset such as when a mobile unit moves between cell sites, a small increment offset such as when distance changes between a mobile unit and a base station, and small decremental offset such as above. The call processor monitors the synchronization of the mobile unit and determines which offset mode is required.

In the large offset mode, the call processor (14 in FIG. 1) performs a search of the frame table of the event generator to find a suitable update time when the event generator is idle. This suitable update time is stored in the update timing controller 202. The amount of the change in offset is also sent to the timing offset selector 200 which is downloaded to the offset register 204. The timing offset update controller 10 monitors the channel clock from the timing block of the protocol timer. When the suitable update time is reached the update timing controller 202 directs the offset register 204 to load the new offset value to the timing block of the event generator. Since the event generator is idle, at the time, there is no need to shut it down or reset it. The change can be made in real-time. Because the offset is defined as large in this mode, the change in offset is added modulo M to the timing block where M is the frame length of the system (5000 in the GSM system, for example) so that the timing is consistent within a frame length. In the present invention, N=2^n where n is the number of bits used to represent M, and M<=N. While M is represented by n bits, the value of the large offset can be represented by fewer bits, then sign-extended to n bits.

In either small offset mode, the channel clock is incremented or decremented by one bit. By only shifting the offset by one bit it is not necessary to turn off or reset the event generator and can be done without intervention by the call processor. For the increment case where the channel clock is at a count of M-1, the offset value is automatically set to 0. Similarly, in the decrement case where the channel clock is at a value of 0, the offset value is automatically set to M-1. This ensures that the offset update process remains modulo M. If the offset value is not equal to M-1, an offset change of N-1 will be added to the current timing offset. Since the timing offset is represented by n bits, adding N-1 modulo M is equivalent to subtraction by 1. This has the advantage of only requiring the synthesis of a single hardware adder. It should be recognized that the above form of subtraction also can be done in the large offset mode.

Updates in the small offset mode can be either synchronized or not synchronized to the start of the channel frame. If the offset mode is synchronized, the update timing controller will wait until the start of the next channel frame to begin the search for a suitable update time. Otherwise, the search for a suitable update window will begin immediately. Once the update tiring controller is in window search mode, it will load the offset update into the offset register 204 unless the is an event scheduled at that time or the channel clock is at 0 or M-1, which prevents problems with channel frame markers when updates are not synchronized with the channel frame. Details of the offset selector are included in the Table 2, which is evaluated once per channel clock tick, preferably.

TABLE 2

| Mode | Small Inc. | Small Dec. | Large offset |
|---|---|---|---|
| Sel2 | 0 | 1 | X |
| Sel1 | 0 | 0 | 1 |
| Sel0 | 0 | 1 | 1 |
| Add value | 1 | N-1 | LARGE_DELTA |
| Update enable | 1 | 1 | 0 |
| Compare Value | M-1 | 0 | X |
| Update Value | 0 | M-1 | X |

Figure 4:
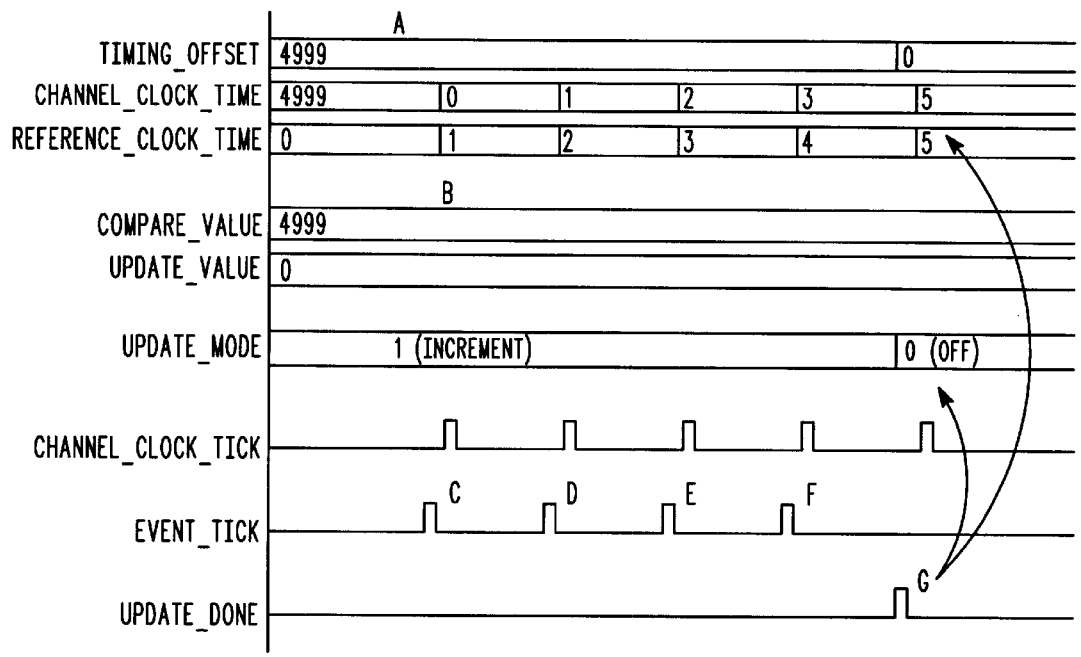
FIGS. 4 and 5 are timing diagrams illustrating the operating of the timing offset update controller of FIG. 3, in accordance with the present invention.
Figure 5:
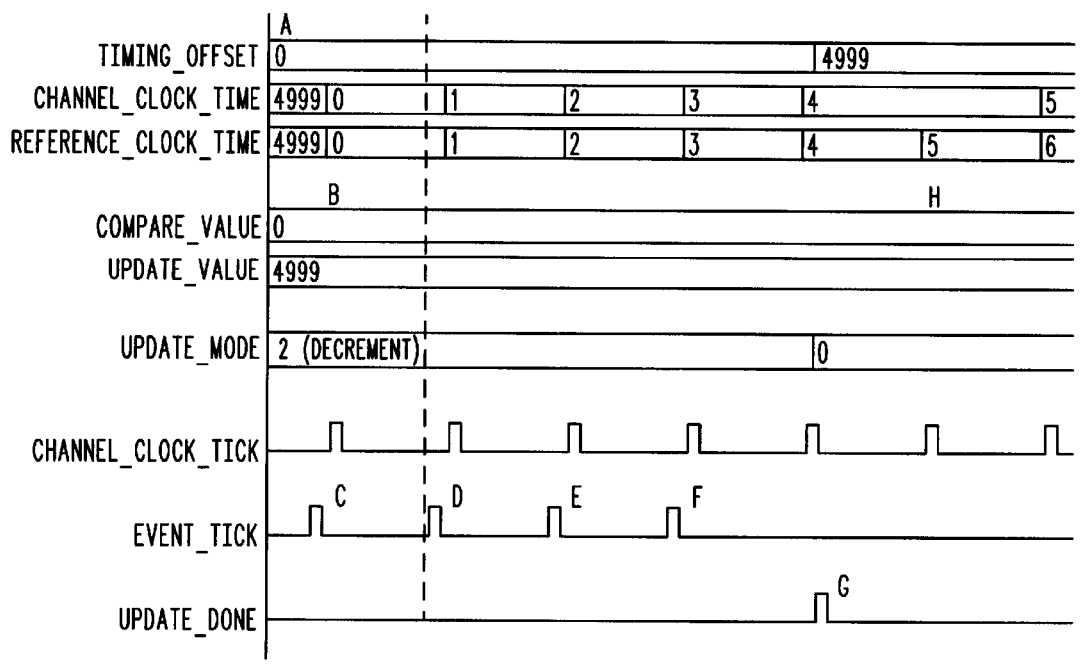

FIGS. 4 and 5 illustrate the behavior of the timing offset update controller in the small offset, increment and decrement modes, respectively. These cases are shown assuming update synchronization to the channel frame. In both figures M=5000, n=13, N=8092.

In FIG. 4, update mode is set to 1 indicating small increment mode. Point A indicates an existing timing offset of 4999 just before the channel time starts a new frame by rolling over from 4999 to 0. The update timing controller will initially try to update the offset at point B. At point C the system signals that it has an event to execute. Therefore, updating during this channel clock tick is prohibited. At points D–F the system still has events to execute. Therefore, the update is put off until the system has no event scheduled. At point G the system has no event scheduled, and the timing offset is incremented by 1 from 4999 to 0. Note that channel time now skips a count going from 3 to 5, and update mode is reset to 0.

In FIG. 5, update mode is set to 2 indicating small decrement mode. Point A indicates an existing timing offset of 0 just before the channel time starts a new frame by rolling over from 4999 to 0. The update timing controller will initially try to update the offset at point B. At point C the system signals that it has an event to execute. Therefore, updating during this channel clock tick is prohibited. At points D–F the system still has events to execute. Therefore, the update is put off until the system has no event scheduled. At point G the system has no event scheduled, and the timing offset is decremented by 1 and changed from 0 to 4999. At point H note that channel time now retains a count of 4 for two channel clock ticks, and update mode is reset to 0.

Figure 6:
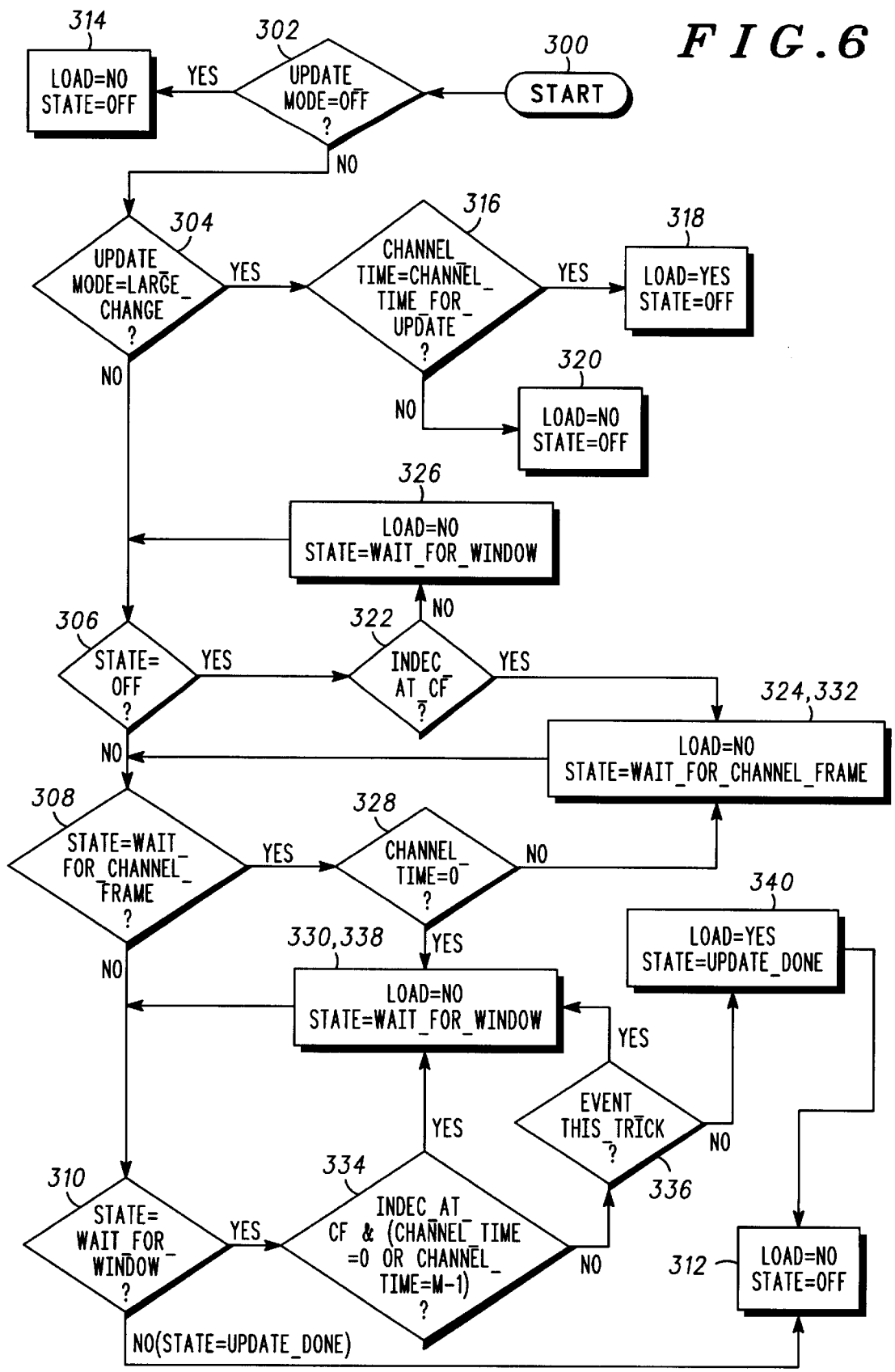
FIG. 6 illustrates a flow diagram of a method in accordance with the present invention.

The present invention also incorporates a method for updating a timing offset for stored events scheduled in an event generator in a radio communication system including at least one base station and a mobile device, as represented in FIG. 6. The method includes a step of measuring a timing change in a timing difference between a reference clock in the mobile device and a channel clock transmitted by the at least one base station. A next step includes adding the timing change to the previously stored timing offset in the timing offset register. A next step includes updating the timing offset in the event generator without interrupting execution of the stored events, such that synchronization is reacquired between the mobile unit and the base station.

In a preferred embodiment, a step is included of selecting between a small timing change between the mobile unit and a base station, such as when a distance changes therebetween within a cell, and a large timing change between the mobile unit and a base station, such as when the mobile unit moves between cells and base stations. Different amounts of change are handled differently in the present invention. For example, during the selecting step when the timing difference is large, before the reading step, the method of the present invention includes searching for a suitable update time within a timing frame for updating the offset register. When the timing difference is small, during the selecting step, the timing change in the adding step is set to one clock tick.

So as to not disturb absolute timing or to miss important frame markers the present invention provides the measuring step includes measuring whether the reference clock is within one clock tick of rolling over. If the reference clock is within one clock tick of rolling over returning to the measuring step.

The above methodology refers in particular to a TDMA system having frames as specified for a TDMA system, wherein the reading step is performed during a frame. However it should be recognized that the application of the present invention would be suitable in any communication system using frame timing. More particularly, the present invention is utilized in a TDMA system wherein the searching step starts at the beginning of a channel frame, and wherein the updating step is synchronized to the start time of a subsequent channel frame.

Preferably, the adding step includes adding the timing change modulo M to the existing timing offset in the offset register, where M is a frame length in the TDMA system. Specifically, This where the timing change is larger than the length of the frame then a modulo M operation is performed on the timing difference where M is the frame length, and wherein the searching step includes the call processor searching a frame table to find a suitable window perform the updating step. This is necessary as the timing in the TDMA system is per frame and it is necessary to reference time per frame. Therefore, time changes greater than one frame are operated on modulo M so that proper timing within a frame is maintained.

In a preferred embodiment of the present invention, the process starts at step 300, as shown in FIG. 6. At step 302, the system checks to see if it is become unsynchronized indicated that an update mode is needed. If the system is still synchronized, at step 314, update mode state remains off and no new timing offset needs to be loaded into the protocol timer. If at step 302, an update is indicated, then step 304 determines if the offset change needed is large or small. If it is large, then the call processor search for a suitable update time in the event generator and the system waits until the channel time reaches that suitable update time at step 316. Until the channel time reaches that suitable update time no new timing offset is loaded into the protocol timer, step 320. When the channel time reaches that suitable update time the new timing offset is loaded into the protocol timer, step 318.

If at step 304, a small offset is indicated, then at step 306, 322 324, the system determines if the offset change should be synchronized to the channel frame. If offset synchronization is indicated then the system waits for the next channel frame at steps 308, 328 and 330. If offset synchronization is not indicated then the system waits for the next channel window at steps 310, 334 and 336. If an increment or decrement is indicated at a frame boundary where the clock is at 0 or M−1 (step 334) or if there is an event scheduled for that time (step 336) then the system will wait for the next window. If neither the clock is at 0 or M−1 (step 334) and there is no event scheduled for that time (step 336) then the system will update the timing offset at step 340 and indicate that the update is complete. Preferably, the above methodology of FIG. 6 is implemented once per channel clock tick.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the broad scope of the invention.

What is claimed is:

1. An apparatus for updating a timing offset for stored events scheduled in an event generator in a radio communication system including at least one base station and a mobile device, the apparatus comprising:

a timing detector for converting a reference clock to a sub-symbol reference frame clock and measuring a timing change in a timing difference between the reference frame clock in the mobile device and a channel clock transmitted by the at least one base station;

a timing update controller coupled to a call processor of the mobile device;

a timing offset register coupled to the update timing controller, the timing detector and the event generator; and an update mode selector coupled to the timing update controller and the timing offset register, wherein the update mode selector distinguishes between a timing change less than one clock tick between the mobile unit and a base station, such as when a distance changes therebetween within a call, and a timing change greater than one clock tick between the mobile unit and a base station, such as when the mobile unit moves between cells and base stations, wherein:

when the timing detector and update mode selector indicate a timing change greater than one sub-symbol clock tick, the timing detector adds the timing change to the existing timing offset in the offset register to be read into the event generator without interrupting execution of the stored events, such that clock synchronization is restored between the mobile unit and the base station.

2. The apparatus of claim 1, wherein when the update mode selector detects a timing change greater than one clock tick, the call processor performs the search of the stored events in the event generator to find a suitable window in a timing frame to update the offset register.

3. The apparatus of claim 1, wherein when the update mode selector detects a timing change less than one clock tick, the timing offset in the offset register is corrected by only one clock tick.

4. The apparatus of claim 1, wherein the radio communication system is a TDMA system and synchronization is reacquired during a frame.

5. The apparatus of claim 1, wherein the radio communication system is a TDMA system and wherein the timing change is added modulo M to the existing timing offset in the offset register, where M is a frame length in the TDMA system.

6. A method for updating a timing offset for stored events scheduled in an event generator in a radio communication system including at least one base station and a mobile device, the method comprising the steps of:

converting a reference clock to a sub-symbol reference frame clock;

measuring a timing change in a timing difference between the reference frame clock in the mobile device and a channel clock transmitted by the at least one base station;

adding the timing change to the previously stored timing offset in the timing offset register when the timing change is greater than one sub-symbol clock tick;

selecting between a timing change less than one sub-symbol clock tick between the mobile unit and a base station, such as when a distance changes therebetween within a cell, and timing change greater than one sub-symbol clock tick between the mobile unit and a base station, such as when the mobile unit moves between cells and base stations; and updating the timing offset in the event generator without interrupting execution of the stored events, such that synchronization is reacquired between the mobile unit and the base station.

7. The method of claim 6, wherein during the selecting step when the timing change greater than one clock tick is selected, before the reading step further comprising the step of searching for a suitable update time within a timing frame for updating the offset register.

8. The method of claim 6, wherein during the selecting step when the timing change less than one clock tick is selected, the timing change in the adding step is set to one clock tick.

9. The method of claim 7, wherein the radio communication system is a TDMA system and wherein the searching step starts at the beginning of a channel frame, and wherein the updating step is synchronized to the start time of a subsequent channel frame.

10. The method of claim 6, wherein the measuring step includes measuring whether the reference frame clock is within one clock tick of rolling over, if the reference frame clock is within one clock tick of rolling over returning to the measuring step.

11. The method of claim 6, wherein the radio communication system is a TDMA system and wherein the reading step is performed dung a frame.

12. The method of claim 6, wherein the radio communication system is a TDMA system, and wherein the adding step includes adding the timing change modulo M to the existing timing offset in the offset register, wherein M is a frame length in the TDMA system.

13. The method of claim 6, wherein the radio communication system is a TDMA system, and wherein the measuring step includes measuring whether the timing change is larger than the length of the frame, wherein if the timing difference is larger than the length of the frame then a modulo M operation is performed on the timing difference where M is the frame length, and wherein the searching step includes the call processor searching a frame table to find a suitable window to perform the updating step.

14. A method for updating a timing offset for stored events scheduled in an event generator in a TDMA radio communication system including at least one base station and a mobile device, the method comprising the steps of:

converting a reference clock to a sub-symbol references frame clock;

measuring a timing change in a timing difference between the reference frame clock in the mobile device and a channel clock transmitted by the at least one base station;

adding the timing change modulo M to the previously stored timing offset in the timing offset register when the timing change is greater than one sub-symbol clock tick, wherein M is a frame length in the TDMA system;

selecting between a timing change less than one sub-symbol clock tick between the mobile unit and a base station, such as when a distance changes therebetween within a cell, and a timing change greater than one sub-symbol clock tick between the mobile unit and a base station, such as when the mobile unit moves between cells and base stations, wherein when the timing change is less than one sub-symbol clock tick the timing change in the adding step is set to one clock tick resuming with the measuring step;

searching for a suitable update time within a timing frame for updating the offset register; and updating the timing offset in the event generator without interrupting execution of the stored events, such that synchronization is reacquired between the mobile unit and the base station.

* * * * *

UNITED STATES PATENT AND TRADEMARK OFFICE
CERTIFICATE OF CORRECTION

PATENT NO.    : 6,560,215 B1
DATED         : May 6, 2003
INVENTOR(S)   : Bloem et al.

It is certified that error appears in the above-identified patent and that said Letters Patent is hereby corrected as shown below:

<u>Column 11,</u>
Line 4, reads "call", should read -- cell --.

Signed and Sealed this

Twenty-second Day of July, 2003

JAMES E. ROGAN
*Director of the United States Patent and Trademark Office*